Oct. 24, 1967  J. W. PARKS ETAL  3,348,696
SEWAGE TREATMENT SYSTEM
Filed Jan. 3, 1966  2 Sheets-Sheet 1
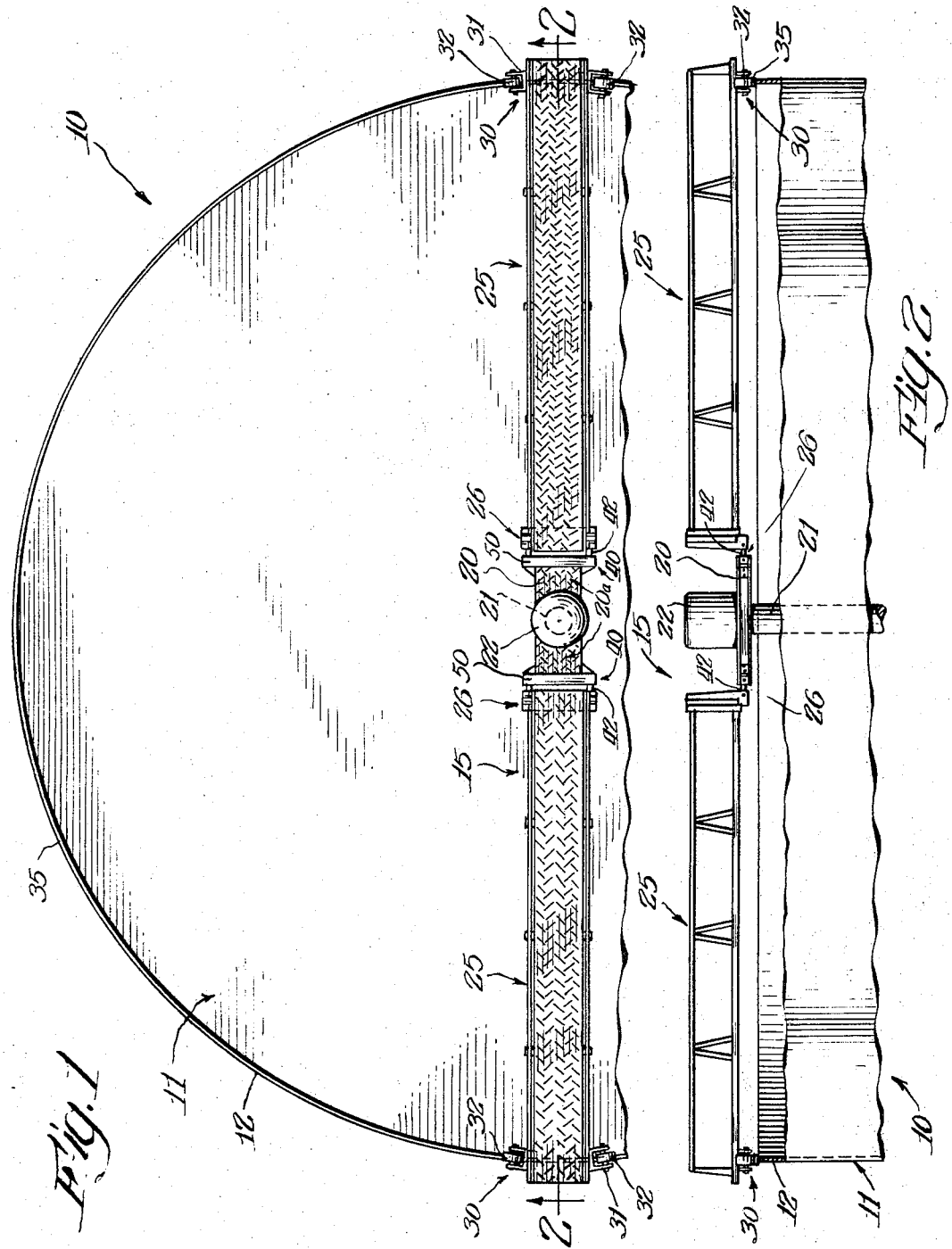
Inventors:
John W. Parks
Ralph A. Olson
Thomas J. Langley
By Hume, Groen, Clement & Hume Attys.

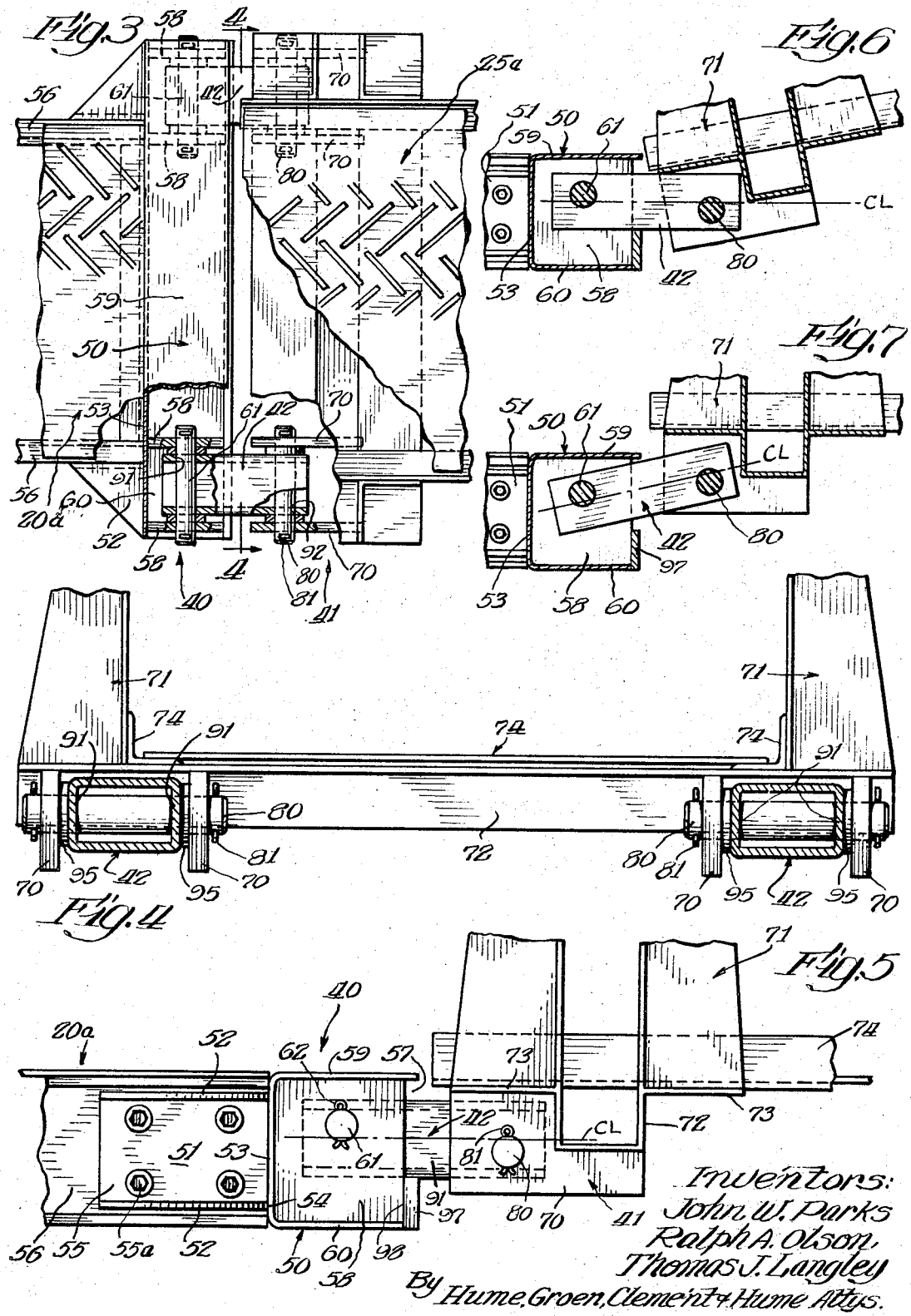

United States Patent Office 3,348,696
Patented Oct. 24, 1967

3,348,696
SEWAGE TREATMENT SYSTEM
John W. Parks, Shawnee Mission, Kans., and Ralph A. Olson, Kansas City, Mo., and Thomas J. Langley, Prairie Village, Kans., assignors to Union Tank Car Company, Chicago, Ill., a corporation of New Jersey
Filed Jan. 3, 1966, Ser. No. 518,427
3 Claims. (Cl. 210—530)

ABSTRACT OF THE DISCLOSURE

A hinge assembly for connecting the wing section to the turntable section of a sewage treatment tank scraper support structure. A toggle link interconnects the sections by means of a pair of pivots which lie in horizontal planes vertically displaced from one another.

---

This invention relates in general to sewage treatment. It deals more particularly with a sewage treatment system of the type which includes a treatment tank employing a rotating bridge arrangement.

In a sewage treatment system of the type in question, a clarifier tank normally defines one stage in a multistage sewage treatment operation. The clarifier tank receives a "mixed liquor" from an initial stage aeration tank. Solids are separated from liquid by settling in the clarifier tank and the liquid is removed separately and disposed of.

The solids accumulate as sludge on the floor of the clarifier tank. They are normally scraped to the periphery (or center) of the tank floor by a plurality of scrapers affixed to and depending from a rotating bridge arrangement surrounding the conventionally circular tank. The scraper construction and arrangement, and details of its relationship to the rotating bridge are described in the co-pending application of Olson et al., Ser. No. 434,371, filed Feb. 23, 1965, entitled, Sewage Treatment System, and assigned to the same assignee as the present invention.

A rotating bridge of this type preferably includes a turntable section which is rotated about a center column in the tank by suitable power means, and a pair of wing sections connected to the turntable section at their innermost ends and supported for travel at their outermost ends on the peripheral wall of the tank. To accommodate slight wall irregularities and obstructions, sometimes encountered in their rotating travel, the bridge wing sections are usually connected to the turntable for vertical pivotal movement about a horizontal axis. The present invention is particularly concerned with the rotating bridge construction, and specifically with the relationship between the turntable and wing sections of the bridge.

It is an object of the present invention to provide an improved rotating bridge arrangement for a sewage treatment tank.

It is another object to provide an improved rotating bridge arrangement of the type which employs hinged wing sections extending radially from a central turntable.

It is yet another object to provide a new and improved hinge assembly for connecting the radially extending wing sections of a rotating bridge arrangement to the center turntable.

It is a further object to provide a hinge assembly which readily accommodates upward movement of the outboard ends of the wing sections, such as occurs when they pass over obstacles on a supporting track, for example, without introducing extraordinary loads on the turntable and center column.

It is yet a further object to provide a hinge assembly which readily accommodates upward movement of the wing sections at the hinge assemblies, such as often occurs when the surface of the clarifier freezes, without introducing extraordinary loads on the turntable and column.

It is still a further object to provide a hinge assembly which has sufficient torsional rigidity to prevent twisting of the bridge wing sections at their hinged ends, even when up-thrust is concentrated under a leading or trailing edge hinge.

The foregoing and other objects are realized in accord with the present invention by providing a new and improved link-type hinge assembly connecting the turntable and radially extending bridge wing sections. The link assembly pivots are constructed and arranged to minimize horizontal movement of the bridge wing sections when either the inner or outer ends of the wing sections are forced upwardly by encountering ice on the sewage surface in the clarifier, or on the peripheral track which supports the outer end of each wing section.

Another aspect of the invention resides in the torsional rigidity provided by the construction and arrangement of the hinge link. There are two such hinge links connecting each bridge wing section with the center turntable and they are constructed and arranged to assure that both rise in unison even though up-thrust may be concentrated under one or the other link and, therefore, neither the bridge wing sections nor the center turntable are subjected to excessive torsional stress.

The invention, both as to its organization and method of operation, taken with further objects and advantages thereof, will best be understood by reference to the following description, taken in connection with the accompanying drawings, in which:

FIGURE 1 is a partial plan view of a clarifier tank with a rotating bridge arrangement embodying features of the present invention;

FIGURE 2 is a side elevational view of the tank taken along line 2—2 of FIGURE 1, with parts removed;

FIGURE 3 is an enlarged plan view of the hinge link arrangement embodying features of the present invention;

FIGURE 4 is a sectional view taken along line 4—4 of FIGURE 3;

FIGURE 5 is an enlarged side elevational view of the hinge link arrangement;

FIGURE 6 is an illustration of the hinge link assembly in operation with upward force on the outer end of a bridge wing section effecting upward movement of the wing section at its outer end; and FIGURE 7 is illustration of the same hinge assembly in operation with upward force effective on the entire bridge wing section, effecting upward movement of the wing section over its entire length.

Referring now to the drawings, and particularly to FIGURES 1 and 2, a portion of a sewage treatment clarifier is illustrated generally at 10. The clarifier 10 includes a tank 11 having a circular cylindrical outer wall 12 and a rotating bridge 15 mounted above the wall.

The rotating bridge 15 includes a turntable 20 rotatably mounted on a vertically disposed central column 21 extending upwardly from the floor (not shown) of the tank 11. A conventional electric motor 22 of suitable horsepower mounted on the turntable 20 is connected to the column 21 in a well known manner to rotate the turntable and, accordingly, the bridge 15 about a vertical axis defined by the column.

The rotating bridge 15 includes two identical wing sections 25 hinged to the central turntable 20 for vertical movement relative thereto on hinge assemblies 26 embodying features of the present invention. The outer end of each wing section 25 extends radially over the wall 12 of the tank 11 and mounts a roller assembly 30 which is adapted to ride on the wall 12 and support the outer end of the wing section as the bridge 15 rotates in a well known manner. Each roller assembly 30 comprises a conventional wheeled truck 31 having a pair of laterally spaced rollers 32 journaled thereon. The rollers 32 are adapted to ride on the upper edge 35 of the tank wall 12.

The rotating bridge 15 usually has scraper assemblies (not shown) secured to and depending from it in the manner illustrated and described in the aforementioned copending application. Since they form no part of the present invention, however, they are not illustrated here. Suffice it to say that the scraper assemblies are carried by the bridge 15 and scrape settled solids in the form of sludge on the floor (not shown) of the tank 11 outwardly (or inwardly) to a collecting trough.

As the bridge 15 rotates in normal operation of the clarifier 10, the rollers 32 are forced upwardly by obstructions, such as accumulated ice during the winter season. This upward movement of the wing sections 25 is readily accommodated by the hinge assemblies 26 embodying features of the present invention. The hinge assemblies 26 accommodate this upward movement with a minimum of horizontal translation of the wing sections 25 toward the turntable 20. Accordingly, no extraordinary loads are brought to bear on the turntable 20 and the center column 21.

The hinge assemblies 26 embodying features of the present invention further accommodate upward lifting of the bridge wing section 25 over their entire length or, alternatively, only at their inner ends (usually caused by ice which has formed on the surface of the clarifier liquid during winter). This upward movement of the wing sections 25 at their hinged ends is also accommodated with a minimum of horizontal translation and without introducing extraordinary loading on the turntable or column 21.

Referring now to FIGURES 3–5, a hinge assembly 26 is illustrated in detail with its relationship to the turntable 20 and an adjoining bridge wing section 25. The hinge assembly 26 includes a hinge subassembly 40 mounted on each end 20a (only one shown) of the turntable 20, and a hinge subassembly 41 mounted on the inner end 25a of each bridge wing section (only one shown). The hinge subassemblies 40 and 41 are interconnected according to the present invention by a pair of toggle links 42.

The hinge subassembly 40 includes a channel member 50 mounted on the turntable end 20a with angle brackets 51. The flanges 52 of the angle brackets 51 are welded to the base 53 of the channel member 50 adjacent either end, as at 54, and the base 55 of each angle bracket 51 is, in turn, secured by conventional machine bolts 55a to the side structural stringers 56 of the turntable 20.

The open mouth 57 of the channel member 50 faces outwardly of the turntable 20, in the manner best illustrated in FIGURE 5. Adjacent each end of the channel member 50 is an identical pair of connecting plates 58 welded between its legs 59, 60, and against its base 53, in spaced relationship. Journaled between each pair of connecting plates 58 is a pivot pin 61. Conventional cotter pins 62 retain the pivot pins 61 in place, as illustrated in FIGURE 3.

The hinge subassembly 41 is broadly similar to the hinge subassembly 40 hereinbefore described. The hinge subassembly 41 includes two pairs of connecting plates 70 mounted under the inner end 25a of the wing section 25 in spaced relationship. As best illustrated in FIGURE 5, each of the connecting plates 70 is generally L-shaped in configuration and is welded to the innermost stanchion 71 of the bridge wing 25.

The stanchion 71 includes a channel 72 having flanges 73 extending horizontally therefrom and underlying the platform 74 of the bridge wing section 25. The L-shaped plates 70 are welded to the outermost of these flanges 73 and the channels section 72 of the stanchion 71.

Journaled between each pair of connecting plates 70 is a pivot pin 80. Each pivot pin 80 is retained in position by a conventional cotter pin 81, as illustrated in FIGURES 4 and 5.

As seen in FIGURE 3, each pair of connecting plates 58 on the turntable 20 is longitudinally aligned with a corresponding pair of connecting plates 70 in each adjacent wing section 25. A toggle link 42 extends between each opposed pair of connecting plates 58, 70, and the pivot pins 61 and 80 are journaled in its opposite ends.

Each toggle link 42 comprises a short segment of steel beam which is rectangular in cross-section and of substantial width according to the present invention. Aligned apertures for receiving a corresponding pivot pin 61 are formed in the opposite side walls 91 of the beam segment toggle link 42 adjacent one end thereof. The apertures 90 lie predominantly above the horizontal center line CL of the link.

On the other hand, aligned apertures 92 are formed in the same side walls 91 at the opposite end of each toggle link 42 for receiving corresponding pivot pins 80.

The apertures 92 lie predominantly below the horizontal line CL of the link 42, all according to the present invention. Spacer discs 95 are provided between the side walls 91 of the links 42 and corresponding connecting plates 58 and/or 70, as best illustrated in FIGURES 3 and 4. In practice, pre-lubricated bushings are also preferably utilized. They form no specific part of the present invention, however, and are not illustrated or further discussed.

Referring now to FIGURE 5, the turntable 20 and an adjacent wing section 25 of the bridge 15 are illustrated in normal operational relationship. It will be recognized that the center lines CL of the hinge links 42 are, in this relationship, horizontal. The inner end 25a of each of the bridge wing sections 25 is prevented from pivoting on the links 42 into a lower position by a stop bar 97 welded in the appropriate position to the outer free edges of the connecting plates 58 on the turntable 20, as at 98.

As the bridge 15 rotates, if the rollers 32 supporting the outer ends of the wing sections 25 encounter obstructions on their supporting track 35, the wing sections are forced upwardly on their outer ends. This frequently occurs where ice forms on the track 35 during the winter, for example. As seen in FIGURE 6, the hinge pins 80 allow for upward movement of the outboard end of the wing sections without introducing extraordinary loads on the turntable 20 and center column 21. The center line offset relationship of the pivot pin receiving aperture in the links 42 forestalls any substantial horizontal translational movement of the bridge wing sections 25 when their outer ends are forced upwardly by ice obstructions, for example, thus avoiding imparting any substantial stress to the turntable 20.

At the same time, as seen in FIGURE 7, the arrangement of the hinge links 42 according to the present invention allows for vertical upper movement of the wing section 25 at the hinge ends (such as might be encountered if the surface of the clarifier freezes) without introducing extraordinary loading on the turntable 20 and column 21. This upward movement is accommodated by the links 42 pivoting about the hinge pins 61, of course.

The pins 80 are lower than the pins 61 in order to reduce horizontal movement of the bridge wing sections 25 when the bridge wing sections are forced upwardly by ice forming on the surface of the clarifier, for example. By this vertically displaced relationship of the hinge pins 61 and 80, jack-knifing of the bridge wing sections relative to the turntable, which might otherwise be caused by in thrust in the wing sections at their outer ends, is also avoided.

The connecting links 42 are of substantially cross-sectional width, as previously pointed out, so that both links rise in unison even though up-thrust might be concentrated under one or the other link. This prevents twisting of the bridge at the hinged end and also forestalls deformation of the turntable 20 or the bridge wing sections caused by unequal force application.

While the embodiment described herein is at present considered to be preferred, it is understood that various modifications and improvements may be made therein, and it is intended to cover in the appended claims all such modifications and improvements as fall within the true spirit and scope of the invention.

We claim:

1. In a sewage treatment tank having a plurality of scrapers affixed to and depending from a rotating bridge arrangement of the type including a center column supported rotatable turntable and a radially disposed wing section adapted for travel at its outermost end on the peripheral wall of the tank, an improvement in hinge assembly for connecting the wing section to the turntable, comprising: first pivot pin means on said turntable, second pivot pin means on said wing section, toggle link means interconnecting said first and second pivot pin means, and stop means on one of said turntable and said wing section for limiting the downward pivotal movement of said toggle link means about said first pivot pin means to support the inner end of said wing section with said wing section in substantially horizontal relationship, said toggle link means permitting said wing section to rise along its entire length without excessively stressing the turntable or the wing section, the pivot axis of said second pivot pin means normally lying in a horizontal plane below the pivot axis of said first pivot pin means.

2. The improvement in hinge assembly of claim 1 further characterized in that said toggle link means comprises a leading link and a trailing link, spaced from each other transversely of the connected turntable and wing section with reference to the direction of rotation of the bridge arrangement, each of said toggle links being of sufficient transverse width to alone substantially prevent twisting of the wing section relative to the turntable when upward force is exerted unequally between said leading link and said trailing link under said wing section.

3. In a sewage treatment tank having a plurality of scrapers affixed to and depending from a rotating bridge arrangement of the type including a center column supported rotatable turntable and a radially disposed wing section adapted for travel at its outermost end on the peripheral wall of the tank, and improvement in hinge assembly connecting the wing section to the turntable, comprising: first pivot means on said turntable, second pivot means on said wing section, and toggle link means interconnecting said first and second pivot means whereby said wing section can rise along its entire length without excessively stressing said turntable or said wing section, the pivot axis of said second pivot means normally lying in a horizontal plane below the pivot axis of said first pivot means so that upward movement of said wing section results in minimal horizontal movement of the wing section.

References Cited

UNITED STATES PATENTS

| 232,747 | 9/1880 | Morgan | 16—165 |
| 1,220,031 | 3/1917 | Vogele et al. | 104—46 X |
| 2,427,092 | 9/1947 | Kamp | 210—530 X |
| 2,437,761 | 3/1948 | Scott | 210—531 |
| 2,642,018 | 6/1953 | Weeber | 16—163 X |

FOREIGN PATENTS

| 370,665 | 4/1932 | Great Britain. |

REUBEN FRIEDMAN, *Primary Examiner.*

J. DECESARE, *Assistant Examiner.*